United States Patent
Bammer et al.

(10) Patent No.: US 8,837,800 B1
(45) Date of Patent: Sep. 16, 2014

(54) AUTOMATED DETECTION OF ARTERIAL INPUT FUNCTION AND/OR VENOUS OUTPUT FUNCTION VOXELS IN MEDICAL IMAGING

(71) Applicant: The Board of Trustees of the Leland Stanford Junior University, Palo Alto, CA (US)

(72) Inventors: Roland Bammer, Stanford, CA (US); Matus Straka, Bratislava (SK); Gregory Albers, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 134 days.

(21) Appl. No.: 13/662,942

(22) Filed: Oct. 29, 2012

Related U.S. Application Data

(60) Provisional application No. 61/628,330, filed on Oct. 28, 2011.

(51) Int. Cl.
*G06K 9/00* (2006.01)
(52) U.S. Cl.
USPC ............ 382/131; 382/130; 382/132; 382/133
(58) Field of Classification Search
USPC ................................................ 382/128–132
See application file for complete search history.

(56) References Cited

U.S. PATENT DOCUMENTS

| | | | |
|---|---|---|---|
| 5,644,646 | A | 7/1997 | Du et al. |
| 6,389,304 | B1 | 5/2002 | Van Den Brink et al. |
| 6,546,275 | B2 | 4/2003 | Carroll |
| 7,069,068 | B1 | 6/2006 | Ostergaard |
| 7,333,848 | B2 | 2/2008 | Charbel et al. |
| 7,400,756 | B2 | 7/2008 | Klotz |
| 2006/0025667 | A1 | 2/2006 | Ashton |
| 2009/0129649 | A1 | 5/2009 | Djeridane |
| 2010/0040264 | A1 | 2/2010 | Volkau et al. |

OTHER PUBLICATIONS

Lorenz et al., "Automated perfusion-weighted MRI using localized arterial input functions", 2006, pp. 1133-1139, Journal of Magnetic Resonance Imaging v24.

Mlynash et al., "Automated method for generating the arterial input function on perfusion weighted MR imaging: validation in patients with stroke", 2005, pp. 1479-1486, American Journal of Neuroradiology v26.

*Primary Examiner* — Amir Alavi
*Assistant Examiner* — Kenny Cese
(74) *Attorney, Agent, or Firm* — Lumen Patent Firm

(57) ABSTRACT

Automated AIF/VOF identification is useful in connection with providing rapid and automatic quantitative imaging results. Examples include CBF (cerebral blood flow) and CBV (cerebral blood volume) perfusion maps. In the present work, AIF/VOF regions of images are identified by making use of a predefined anatomic vasculature template to provide numerical weighting values for voxels. A score is computed for each voxel that includes normalized signal fit parameters and the numerical weighting. AIF/VOF voxels are identified as N voxels having the highest score, where N can depend on the image resolution.

10 Claims, 7 Drawing Sheets

AUTOMATED DETECTION OF ARTERIAL INPUT FUNCTION AND/OR VENOUS OUTPUT FUNCTION VOXELS IN MEDICAL IMAGING

CROSS REFERENCE TO RELATED APPLICATIONS

This application claims the benefit of U.S. provisional patent application 61/628,330, filed on Oct. 28, 2011, entitled "Methods for processing CT perfusion or MR diffusion/perfusion imaging data in cerebrovascular diseases", and hereby incorporated by reference in its entirety.

FEDERALLY-SPONSORED RESEARCH OR DEVELOPMENT

This invention was made with Government support under contracts EB002711 and NS039325 awarded by the National Institutes of Health. The Government has certain rights in this invention.

FIELD OF THE INVENTION

This invention relates to medical imaging.

BACKGROUND

In analysis of medical imaging results, such as magnetic resonance (MR) images and/or computed tomography (CT) images, it is often desirable to provide quantitative results, such as quantitative perfusion maps. To provide such results, identification of arterial input function (AIF) and venous output function (VOF) regions of images is typically required. Manual identification of such regions is time consuming and subject to operator preference and operator variation. Automatic AIF/VOF identification has been considered. However, conventional automated methods tend to be insufficiently robust in the presence of patient motion and/or noise. Accordingly, it would be an advance in the art to provide improved automated AIF/VOF identification.

SUMMARY

Automated AIF/VOF identification is useful in connection with providing rapid and automatic quantitative imaging results. Examples include CBF (cerebral blood flow) and CBV (cerebral blood volume) perfusion maps. In the present work, AIF/VOF regions of images are identified by making use of a predefined anatomic vasculature template to provide numerical weighting values for voxels. A score is computed for each voxel that includes normalized signal fit parameters and the numerical weighting. AIF/VOF voxels are identified as N voxels having the highest score, where N can depend on the image resolution.

Automated AIF/VOF identification according to these principles can be enhanced in various ways. Arteries can be distinguished from veins by using tubular filtering of a $\Delta R2^*$ signal (from MR), where early $\Delta R2^*$ signals (relative to peak $\Delta R2^*$) relate to arteries, and where late $\Delta R2^*$ signals (relative to peak $\Delta R2^*$) relate to veins. Tubular filtering can be used as a general technique for enhancing artery/vein features.

Tubular filtering can also be used to provide estimates of blood vessel orientation. Such orientation estimates can provide improved quantitative estimates of blood vessel tracer concentration, which in turn can improve the accuracy of determining quantitative perfusion parameters from the imaging data.

Another enhancement of the above-described AIF/VOF identification is to compute tissue blood volume from a ratio of tissue and large vessel tracer concentrations, and to compute small vessel arterial blood volume from a ratio of small vessel and large vessel tracer concentrations.

A further enhancement of automatic AIF/VOF identification is to provide a computer system to implement this automated method. Such a system can include any combination of hardware and/or software. For example it can include sending and receiving computer systems that transmit and receive medical imaging data via a network. Real time software processes can parse medical image header information to identify prespecified commands for medical image processing and can executes the commands on the receiving computer without user interaction. Processed medical images can be automatically converted into tagged images by suitable software. The tagged images can be sent to mobile and/or stationary display devices by the system.

Yet another refinement of automated AIF/VOF detection is to perform slice-to-volume registration for imaging data, as opposed to slice-to-slice registration.

Registration can also be improved by using a normalized 3-D template (e.g., a brain template), where major arteries and veins are identified on the template. A nonlinear co-registration of imaging data to this template can be inverted to provide artery and vein location estimates in the coordinate frame of the patient.

DETAILED DESCRIPTION

Figure 1:
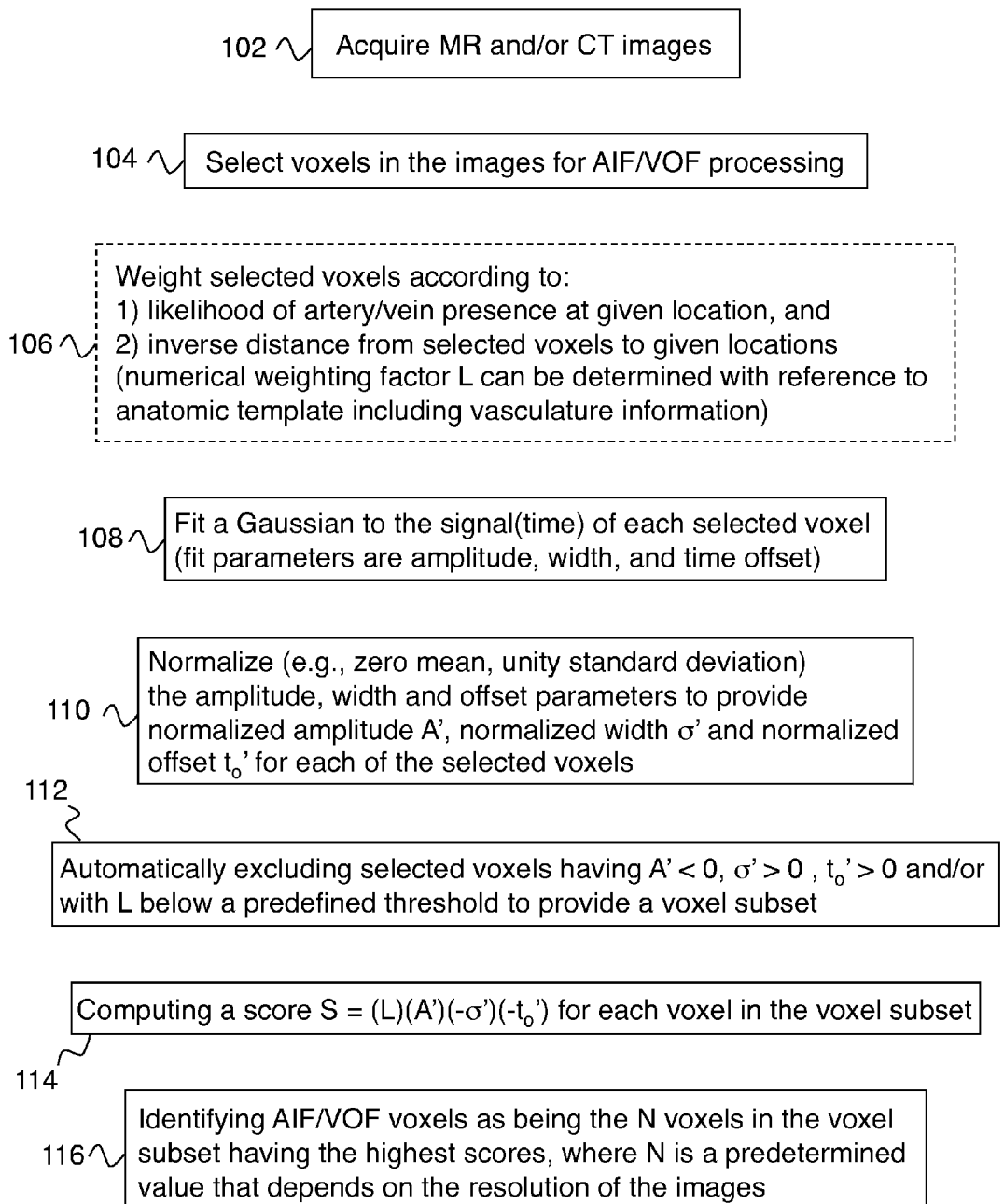
FIG. 1 shows an exemplary method according to an embodiment of the invention.

A) Automated AIF and VOF Detection—General Principles

The AIF is used to reduce variability of computed rCBV, rCBF, MTT (mean transit time) and Tmax values in presence of inter-patient differences, due to injection protocol, catheter size, cardiac output, amount and concentration of the bolus, etc. The VOF is used as a scaling factor that improves absolute quantitative accuracy of the CBV and CBF estimation, by delivering a known quantitative factor that can be used for scaling of relative perfusion parameters (rCBV, rCBF) to absolute (CBV, CBF) values. To achieve this, the VOF is deliberately selected in an imaging volume element located within a large vessel such that the whole imaging element represents pure blood (with no spurious contribution from surrounding tissue).

In previous clinical trials, we have had the experience that the veracity of the AIF and VOF often depends on the experience and skills of the operator, and often is one of the major time-limiting factors of PWI (perfusion weighted imaging) analysis. A completely automated selection of the AIF and VOF avoids any bias from human interaction and would allow a much faster generation of perfusion maps. In two National Institutes of Health-funded clinical trials (DEFUSE 1 and DEFUSE 2), automated AIF routines have been demonstrated to reliably select candidate voxels for the AIF and VOF.

We provide a new automated AIF and VOF tool. First, the AIF tool may run fully automatically or in semi-automatic mode. In the semi-automatic mode, the technologist or stroke neurologist can select—based on the initial DWI images—the hemisphere or vascular territory to which the AIF search should be restricted. Second, to select the AIF voxel, the detection algorithm fits a Gaussian function to the time course of each voxel. Gaussian fits for AIF/VOF detection have been considered by Mlynash et al. (AJNR 26:1479-1486, 2005). One of the key innovations of the present approach is that the parameters of the Gaussian function, i.e. amplitude A, width $\sigma$, and time offset $t_0$ are normalized by subtracting the mean value of all voxels, $x_m$, and dividing by the standard deviation $\langle x \rangle$: $x' = (x - x_m)/\langle x \rangle$ with x being either A, $\sigma$, or $t_0$. The resulting normalized parameters (i.e., A', $\sigma'$, and $t_0'$) have zero mean and unity standard deviation. The normalization makes the selection independent of image scaling and shifting which may vary from scan to scan. The general criterion for an AIF voxel is (1) a large A, (2) a small $\sigma$, (3) an early $t_0$ and (4), in a location that is consistent with typical brain vasculature anatomy.

Thus, all voxels with A'<0, $\sigma'$>0, and $t_0'$>0 will be excluded and a score $A' \cdot (-t_0') \cdot (-\sigma')$ will be assigned to each remaining voxel. Candidate voxels in locations that are not anatomically meaningful are discarded. The N voxels with the highest score, which are also spatially clustered, will be chosen as potential AIF sites. Typically, 20 voxels will be used as a good trade-off between improved SNR and potential dispersion. Third, another key innovation, based on prior anatomical knowledge (e.g. brain atlas) only voxels from a select region (e.g., in proximity to the main intracranial arteries and veins) will be searched. Lastly, due to the different relaxivity of arterial and tissue signal and the nonlinear behavior of the arterial enhancement for different contrast concentrations, we optionally may add a look-up table for contrast concentration changes based on $\Delta R2^*$ values for bulk blood measured under controlled conditions in vitro: $\Delta R2^* = 0.62 \times [Gd] + 0.57 \times [Gd]^2$.

Selection of the VOF uses a similar algorithm, however there are three major differences in the VOF-searching algorithm:

1) To find a suitable VOF location, only time-concentration curves that manifest their peak 3-12 s (empirical observation) after the AIF peak are considered acceptable for VOF;
2) To find a suitable VOF location, only those time-concentration curves that happen to be located in posterior brain are considered acceptable for VOF. Determination of such spatial location can be based on a simple anatomic model of human head that assumes that human head is roughly spherical and the anterior-posterior orientation of the patient head in the image is aligned with the ascending coordinates of the image space. Alternatively, the spatial location for VOF selection can be determined via a detailed anatomic template, upon coregistration of the template with the investigated brain. Thus, any anatomic locations that are not consistent with location of a large vein are excluded; and
3) To find a suitable VOF location, the requirement for width of the VOF curve is also relaxed (compared to AIF curve selection), because the VOF curve peak tends to be wider than the AIF curve peak. Any candidate curve for VOF with width up to 3 times the width of the AIF curve is considered acceptable for selection, while candidate curves with width >3*AIF width are discarded.

With these modifications, a similar weight is computed for each candidate VOF location, these weights are then spatially clustered and a cluster with highest overall score (across N voxels, N is typically around 10), is then used for selection of the VOF. N time-concentration curves in the selected cluster are then averaged to obtain a mean VOF curve.

An exemplary method according to these principles is shown on FIG. 1. In step 102, one or more CT and/or MR perfusion images are acquired. In step 104, some or all of the voxels of the perfusion images are automatically selected for AIF/VOF processing. In optional step 106, each selected voxel is weighted according to a numerical weighting factor L, where L represents a combination of: 1) a likelihood of presence of a physiologically relevant artery or vein in a given location, and 2) an inverse of distance of the selected voxel to the given location containing the artery or vein. The numerical weight L can be determined with reference to a predefined, atlas-based anatomic template of the brain and its vasculature In step 108, a Gaussian is fit to the signal(time) of each selected voxel. The fitting parameters are amplitude A, width $\sigma$, and time offset $t_o$. In step 110, each of the fitting parameters (i.e., amplitude, width and offset) is automatically normalized to zero mean and unity standard deviation to provide normalized amplitude A', normalized width $\sigma'$ and normalized time offset $t_o'$ for each selected voxel. In step 112, voxels having A'<0, $\sigma'$>0, $t_o'$>0 and/or with L below predefined threshold are automatically excluded. It is convenient to refer to the remaining voxels as the voxel subset. In step 114, a score $S = L \cdot A' \cdot (-t_o') \cdot (-\sigma')$ is computed for each voxel in the voxel subset. Equivalent score formulas such as $S = L \cdot A' \cdot (t_o') \cdot (\sigma')$ can also be employed. If the numerical weighting factor L is not computed, then the score can be computed as $S = A' \cdot (-t_o') - (-\sigma')$. In step 116, the AIF/VOF voxels are identified as being N voxels in the voxel subset having the highest scores, where N is a predetermined integer that depends on the spatial resolution of the perfusion images.

B) Robust AIF and VOF Detection

A further aspect of the present approach is robust AIF and VOF determination. Further details relating to this aspect are described in section H below. To summarize, arterial and venous $\Delta R2^*$ signals tend to arrive at different points in time—the arterial signals arrive early, and the venous signals arrive late. Accordingly, it is possible to use this feature of the signals to improve the identification of AIF and VOF locations.

An exemplary method according to these principles extends the method of section A as follows (for MR imaging): i) determining a spatially averaged $\Delta R2^*$ signal in the brain as a function of time; ii) identifying a time T0 where the spatially averaged $\Delta R2^*$ signal has its peak; iii) performing tubular filtering on an MR image of a brain at times before T0 to identify arteries; iv) performing tubular filtering on an MR image of a brain at times after T0 to identify veins; v) determining AIF locations from the identified arteries; and vi) determining VOF locations from the identified veins.

Another exemplary method according to these principles extends the method of section A as follows (for MR and/or CT imaging): i) performing tubular filtering on CT or MR perfusion images to identify arteries and/or veins; ii) determining AIF locations from the identified arteries; and iii) determining VOF locations from the identified veins.

C) Orientation Corrected Phase Based AIF and VOF

A further aspect of the present approach is orientation corrected AIF and VOF determination. Further details relating to this aspect are included in section I below. To summarize, tubular filtering can be used on MRI images to enhance cylindrical structures (e.g., blood vessels). These results can be used to determine blood vessel orientation, which in turn can increase the accuracy of quantitative perfusion parameters from the MR data.

An exemplary method according to these principles extends the method of section A as follows (for MR imaging having phase and amplitude information): i) performing tubular filtering on the MR images to provide estimates of blood vessel orientation; ii) using the estimates of blood vessel orientation to provide improved quantitative estimates of blood vessel tracer concentration; and iii) using the estimates of blood vessel tracer concentration to derive quantitative perfusion parameters from the MR images.

D) Scaling the Tissue Blood Volume to Avoid Quantitative Errors Caused by Signal-Saturation A further aspect of this approach is scaling the tissue blood volume to avoid signal saturation. In large blood vessels, the tracer concentration signal can saturate, which leads to inaccurate quantitative results. This problem can be alleviated as follows. A post-bolus tracer/contrast-agent concentration in tissue (S1) can be determined averaging over $N_1$ post-bolus steady-level baseline time points therein. A post-bolus tracer/contrast agent concentration in large vessel (S2) can be determined by averaging over $N_2$ post-bolus steady-level time points therein. A large vessel is defined as a vessel that is large enough so it contains one or more image volume elements (voxels). The relative cerebral blood volume CBV (rCBV) can be then determined from the signals S1 and S2, as:

$$rCBV_{tissue} = S1/S2,$$

instead of computing it from the first passage of the tracer as is conventionally done. In an identical manner, blood volume in a smaller vessel can be again determined by using ratio $$rCBV_{small\_vessel} = S3/S2,$$

where S3 is the tracer/contrast-agent concentration in the small vessel obtained by averaging over $N_3$ post-bolus steady-level baseline time points therein. Here a small vessel is defined as a vessel that is smaller than an entire image voxel and contains also tissue. With this approach, one can avoid errors in estimation of blood volume that are caused by signal saturation.

An exemplary method according to these principles extends the method of section A as follows (for MR and/or CT imaging): i) determining a tissue post-bolus tracer/contrast agent concentration level (S1) by averaging over $N_1$ post-bolus steady-level time points located in tissue; ii) determining a large vessel tracer/contrast agent concentration (S2) by averaging over $N_2$ postbolus steady-level time points located in a large vessel; iii) determining a small vessel tracer/contrast agent concentration (S3) by averaging over $N_3$ postbolus steady-level time points located in a small vessel; iv) computing tissue blood volume from steady state tissue and large vessel tracer concentrations ($rCBV_{tissue} = S1/S2$); and v) scaling small vessel arterial blood volume $rCBV_{small\_vessel}$ with large vessel blood volume as ($rCBV_{small\_vessel} = S3/S2$).

E) Medical Image Data Processing

A further aspect of this approach is medical image data processing. Sending computers and/or imaging modalities (e.g., workstation, Picture Archiving and Communication System (PACS) etc.) can transmit medical imaging data via a computer network. Similar devices can receive medical imaging data via the computer network. Real-time software can parse medical image (e.g., DICOM (Digital Imaging and Communications in Medicine)) headers to identify prespecified commands for medical image processing and independently launch these processing operations on a receiving computer without user-interaction. Such operations include (but are not limited to) perfusion-diffusion mismatch calculation, etc. Processed medical images can be converted to tagged images such as (but not limited to) DICOM, JPEG (Joint Photographic Experts Group), PNG (Portable Network Graphics), TIFF (Tagged Image File Format) formats. The tagged images can be automatically routed to arbitrary computer/imaging modality/workstation/PACS as well as mobile devices, such as (but not limited to) iPhone®, iPad®, Android® and Blackberry®.

An exemplary system according to these principles is configured to perform the method of section A and can include: i) a sending computer system that transmits medical imaging data via a computer network; ii) a receiving computer system that receives medical imaging data via the computer network; iii) a real-time software process that parses medical image header information to identify prespecified commands for medical image processing and executes the commands on the receiving computer without user interaction; iv) a software process that converts processed medical images into tagged images; and v) a software process that sends the tagged images to a mobile or stationary display device.

F) Co-Registration of MR/CT Data in 3D

A further aspect of the present approach is 3-D co-registration of MR/CT data. In practice, one often has a set of MR/CT data that resembles a full 3D volume at T distinct time points. However, the raw images of this data set are generally not registered to each other, which is an impediment to further processing. To address this problem, the first step is to define a template volume. The template volume can be an average of the T volumes, or it can be a selected one of the volumes that has the best quality, least imaging artifacts, etc. Once the template volume is defined, each of the T volumes can be registered to the template volume. This process can be iterated. For example, let a set of volumes V be registered to produce a set of registered volumes V'. A new template can be determined from the set of registered volumes V', and a second registration with respect to this new template can be performed. This iteration can be repeated any number of times. Identification of possible inconsistencies of 2D-multi-slice (pseudo 3D) volume package and performing slice-to-volume registration can be done, instead of volume-to-volume registration, to provide improved registration for slices that do not conform to the true 3D object. In particular, any 2D-multislice (pseudo 3D) acquisition, which acquires 2D slices over a certain timeframe to constitute a 3D volume, can be subject to patient motion during this timeframe, leading to mutual misalignment of individual slices within the imaged volume. True 3D acquisitions (i.e. whole 3D volume acquired within a very short time) are less likely to manifest slice-by-slice misalignment in the dataset, showing only whole-body motion. Therefore, the present motion-correction technique improves registration results with 2D-multislice datasets, if every slice is aligned independently (to a 3D template), instead of aligning the whole stack of 2D slices at once.

An exemplary method according to these principles extends the method of section A as follows (for MR and/or CT imaging): i) acquiring CT or MR time series data that resembles a full 3D volume at T distinct times points; ii) 3D-Registering each of the T volumes to a template volume the template volume can be the average of all T volumes or a selected one of the volumes with best quality and least imaging artifacts); iii) iterating the 3D-registration and computing a 3D-registration template volume using the registered volumes from the previous registration; and iv) identifying possible inconsistencies of a 2D-multislice volume and performing slice-to-volume registration, to provide improved registration for 2D slices that do not conform to the true 3D object.

G) Automatic Identification of Arteries and Veins

A further aspect of the present approach is automatic identification of arteries and veins. First, MR or CT perfusion images are acquired at several points in time (these can be the cine time series data that are used to compute perfusion parameters). A time-average perfusion image is calculated as an average over all time points. Next, non-linear co-registration of the time-average perfusion image to a normalized 3D reference template (e.g., a brain template) is performed.

Here, the non-linear registration includes a 3D rigid registration step and a non-linear 3D spatial warping step that makes either one or more pre-specified anatomical landmarks, the surface of brain (sulci and gyri), the entire volume of the brain, or any combination of these to be in registration with a 3D brain template (i.e. an atlas) using a predefined cost function that drives this spatial warping to be optimal in the sense of this cost function. Next, arteries and veins are identified on the brain template. Finally, the preceding non-linear registration is inverted to determine the location of the arteries and veins in the time average perfusion image (i.e., in the individual patient coordinate frame of reference).

An exemplary method according to these principles extends the method of section A as follows (for MR and/or CT imaging): i) performing non-linear co-registration of the average over all time points of the perfusion image volumes from a patient to a normalized 3D reference template; ii) identifying major arteries and veins on the reference template; and iii) performing an inverse of the non-linear co-registration of regions labeled as arteries and veins from the normalized 3D reference template to a coordinate frame of reference of the patient.

H) Example 1

Using Timing to Distinguish Arteries and Veins

H1) Introduction

Routine acquisition of DSC-MRI (dynamic susceptibility contrast MR imaging) brain perfusion datasets highly benefits from fully automated algorithms because manual processing is lengthy and subject to operator preference. Unsupervised computation can deliver results in very short times and thus can provide perfusion measurements in emergency settings (e.g. in acute stroke). To deliver quantitative perfusion maps, deconvolution is typically applied which requires selection of arterial input (AIF) and venous output (VOF) functions. Automated selection of AIF and VOF has been addressed by several groups in the past but robustness of the proposed methods in presence of patient motion and noise remains questionable. The robustness is very important for reliable unsupervised application. Existing methods evaluate properties of the temporally resolved signals (amplitude, width, delay) and do not inherently ensure that the AIF/VOF location will be chosen in anatomically meaningful location, i.e. inside or nearby a large feeding artery. Selection of VOF is especially difficult, because only delay and anatomical location can segregate arteries from veins. Additionally, due to susceptibility effects and bulk flow, the DSC-MRI signals might differ depending on orientation of the vessel in question versus main B0 and vs. slice orientation. Robust detection of AIF and VOF should take into account actual location of the intracranial vessels and their orientation, not only the temporal information.

H2) Methods

Figure 2A:
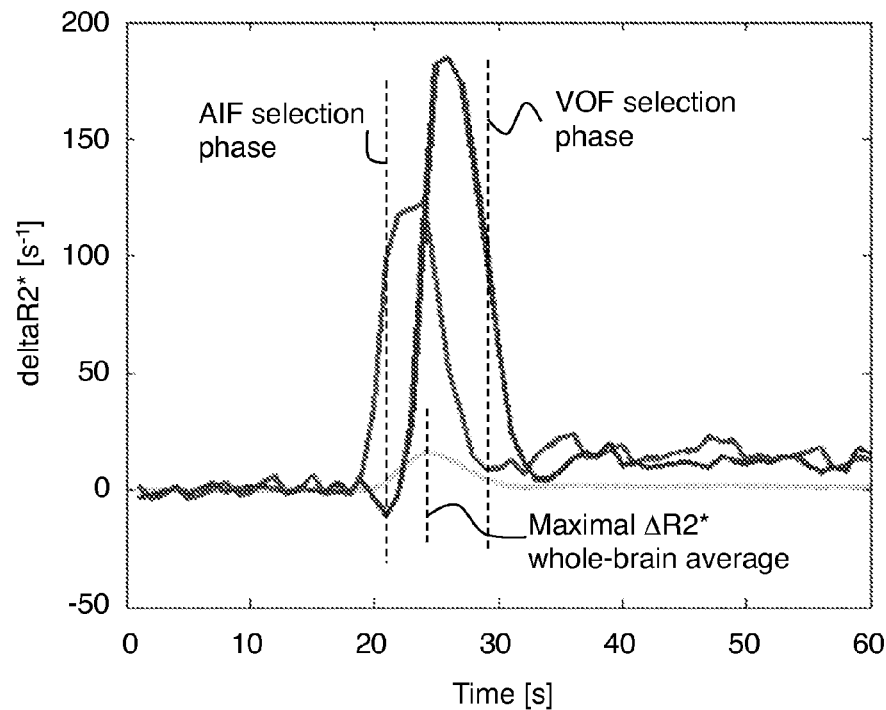
FIGS. 2a-b show results from an experiment where time delay is used to distinguish arteries from veins.
Figure 2B:
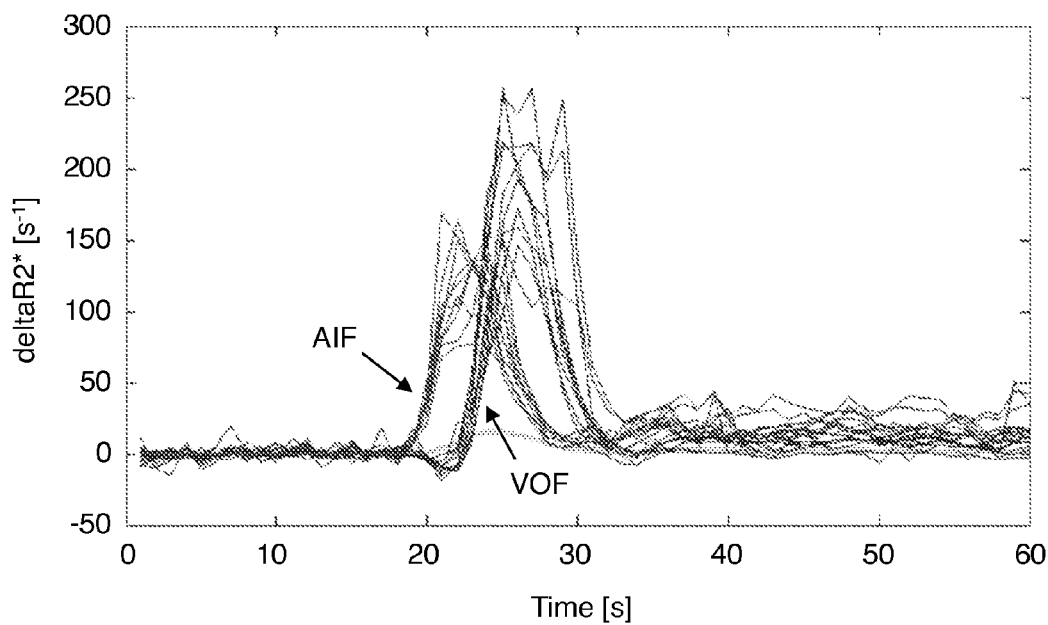
Figure 3A:
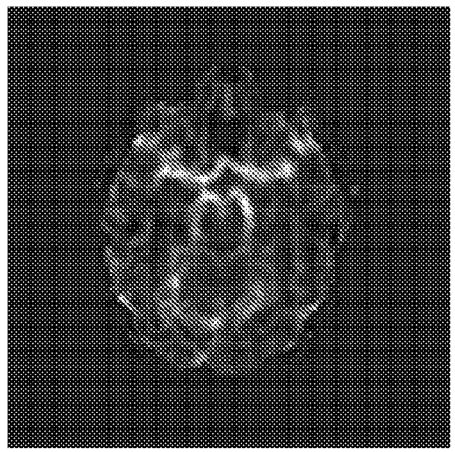
FIGS. 3a-e show an example of selective identification of AIF regions on medical images
Figure 4A:
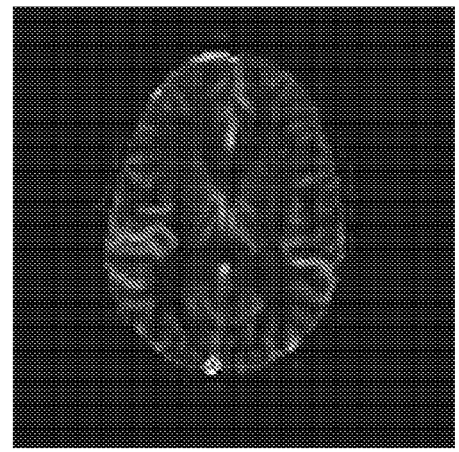
FIGS. 4a-e show an example of selective identification of VOF regions on medical images.
Figure 3B:
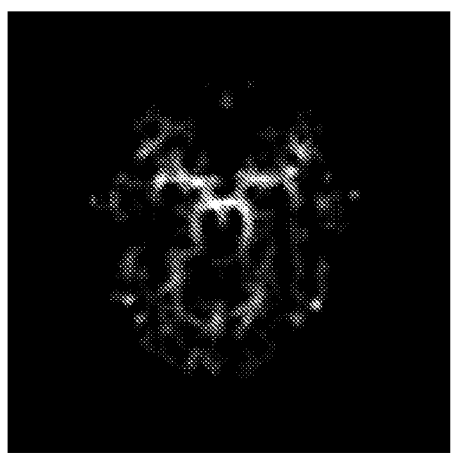
Figure 4B:
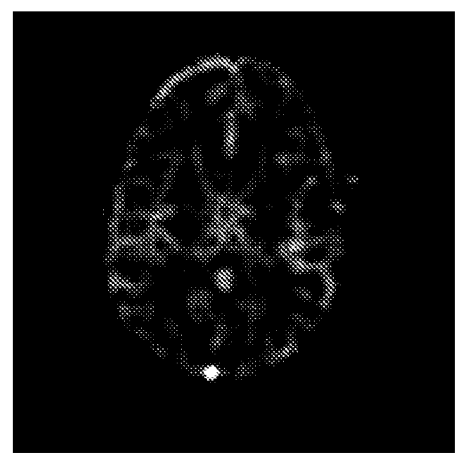
Figure 3C:
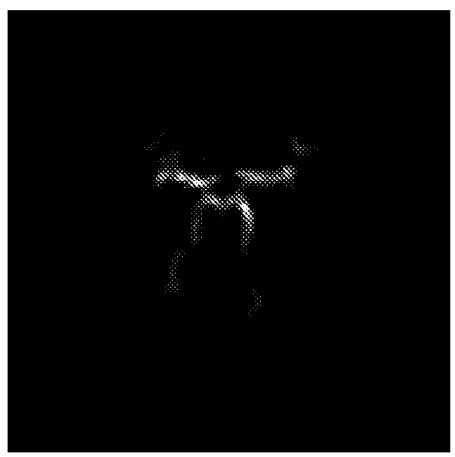
Figure 4C:
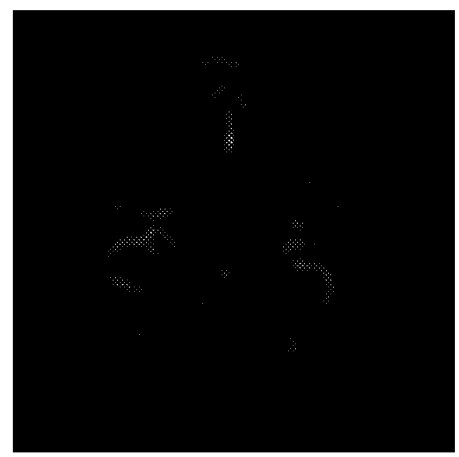
Figure 3D:
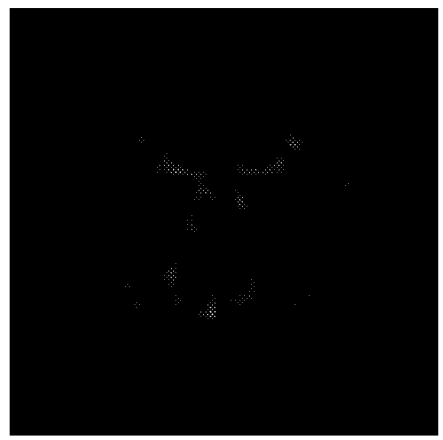
Figure 4D:
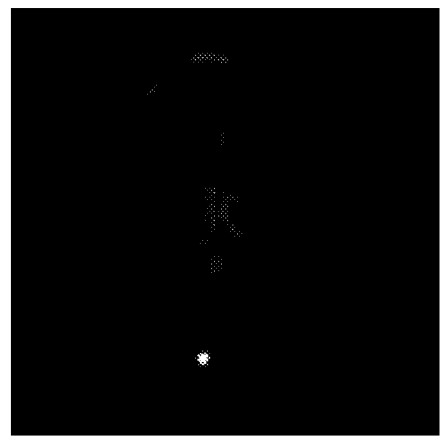
Figure 3E:
Figure 4E:
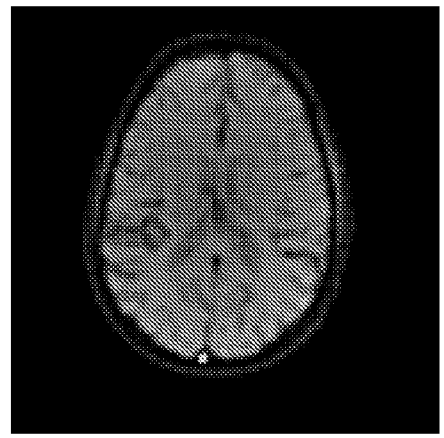

DSC-MRI data, when gadolinium is present can be seen as a 'poor-man's 3D angiography'. Applying a tubular filter to such data, cylindrical structures can be enhanced. To separate arterial and venous signals, the following analysis can be performed: First, a signal representing $\Delta R2^*$ averaged over the whole brain is determined. Exemplary data is shown on FIGS. 2$a$-$b$. On FIG. 2$b$, individual AIF and VOF traces are shown, and the corresponding averages are shown on FIG. 2$a$. Arterial locations will manifest strong signals very early before the peak of the average signal (typically 4-5 s earlier); whereas venous signals will show very strong signals even 6-7 s after the peak. Therefore, when the tubular filter is applied in an early frame it will deliver weighting factors that favor AIF, whereas the filter applied in a late frame will favor VOF locations. Additionally, the filter can deliver information about vessel orientation and thus factors that can prefer certain vessel orientation.

H3) Results

Achieved results are presented in FIGS. 3$a$-$e$ and 4$a$-$e$. FIGS. 3$a$-$e$ demonstrate selective identification of AIF, and FIGS. 4$a$-$e$ demonstrate selective identification of VOF. FIGS. 3$a$-$e$ all relate to the same horizontal brain slice. FIGS. 4$a$-$e$ all relate to the same horizontal brain slice (distinct from the slice of FIGS. 3$a$-$e$). FIGS. 3$a$ and 4$a$ show maximal $\Delta R2^*$ images. FIGS. 3$b$ and 4$b$ show the maximum of the tubular filtering response over all frames. FIGS. 3$c$ and 4$c$ show early phase tubular filtering images. Note that FIG. 3$c$ shows a clear image, and FIG. 4$c$ does not. FIGS. 3$d$ and 4$d$ show late phase tubular filtering images. Note that FIG. 3$d$ does not show a clear image, and FIG. 4$d$ does (i.e., the vertically oriented sagittal sinus vein, appearing as a dot on FIG. 4$d$). Color coding of the images can be used to display vessel orientation. FIGS. 3$e$ and 4$e$ show the detected AIF/VOF locations relative to brain slice images. By application of the tubular filter, non-vascular structures are suppressed, and vessel orientation can be detected.

H4) Discussion

A novel method for robust detection of AIF and VOF in automated processing of DSC-MRI data is provided. The approach is inherently robust in presence of noise and forces selection of AIF and VOF inside a large vessel, while promoting regions with strong signals and high contrast. By using time criteria, selection of either arterial or venous signals can be achieved. Additionally, weighting terms with respect to vessel orientation can be determined and can be used to improve accuracy of AIF and VOF signals. With advanced processing it is possible to detect vessel center (maximum of tubular filter response in plane perpendicular to the vessel orientation) and thus enforce selection of AIF and VOF several voxels outside of the vessel.

I) Example 2

Orientation-Corrected Phase-Based AIF and VOF

I1) Introduction

The orientation of a blood vessel relative to the main magnetic field will affect the absolute amplitude of both the AIF and the VOF. A tubular filter or something of this nature can be used to measure the orientation of the vessel. Based on the orientation of the slice relative to the magnetic field, we can determine the orientation of the vessel relative to the main B0 field of MR imaging.

Using this information, the intravascular concentration of a paramagnetic tracer can be estimated using Eq. 1, where $\theta$ is the tilt angle of the vessel relative to B0, $t_{TE}$ is the echo time, $\Delta\phi$ is the tracer-induced change of phase relative to the background phase, $\rho$ is molar susceptibility of gadolinium ($\rho$=0.026 ppm/mM in cgs units), and k is a scaling factor (empirically determined to be k=0.02).

$$c_b = k \frac{\Delta\phi}{\rho t_{TE} \gamma B_0 \left(\cos^2\theta - \frac{1}{3}\right)} \quad (1)$$

To estimate $\theta$, tubular-filtering can be used on the maximum of R2*-shortening values derived from magnitude signals in DSC-MRI data. The latter can be regarded as a 'poor-man's 3D angiography'. Tubular filtering of such a dataset yields an estimate of the vessels orientation. The tubular filter is inherently robust against noise and suppresses non-cylindrical structures (typically imaging artifacts). It also suppresses objects of sizes much larger or much smaller than the selected kernel size.

I2) Results

Experimental verification was performed on MR test data using a multi-echo GRadient-Echo Echo-Planar Imaging (GRE-EPI) PERfusion with Multiple Echoes and Temporal Enhancement (PERMEATE) sequence, TR=1.225 s, matrix 96×96, TE1,2,3=15;34;51 ms, FOV=24 cm, 15 slices, slice thickness 5 mm, gap 2 mm, $B_0$=1.5T, and an in-house written data reconstruction.

Figure 5A:
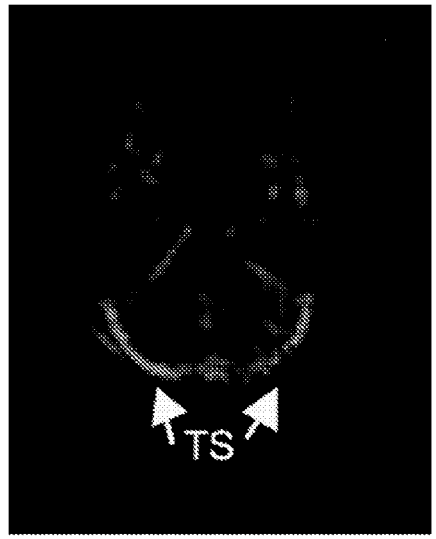
FIGS. 5a-d show an example of tubular filtering in connection with AIF/VOF identification.
Figure 5B:
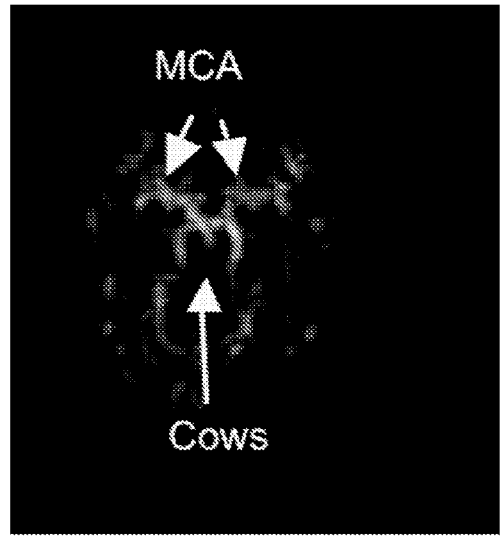
Figure 5C:
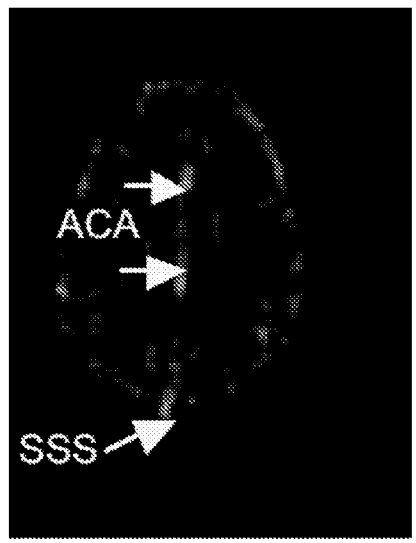
Figure 5D:
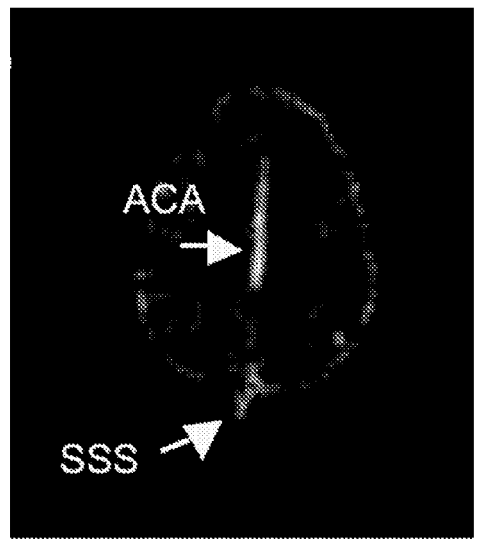
Figure 6A:
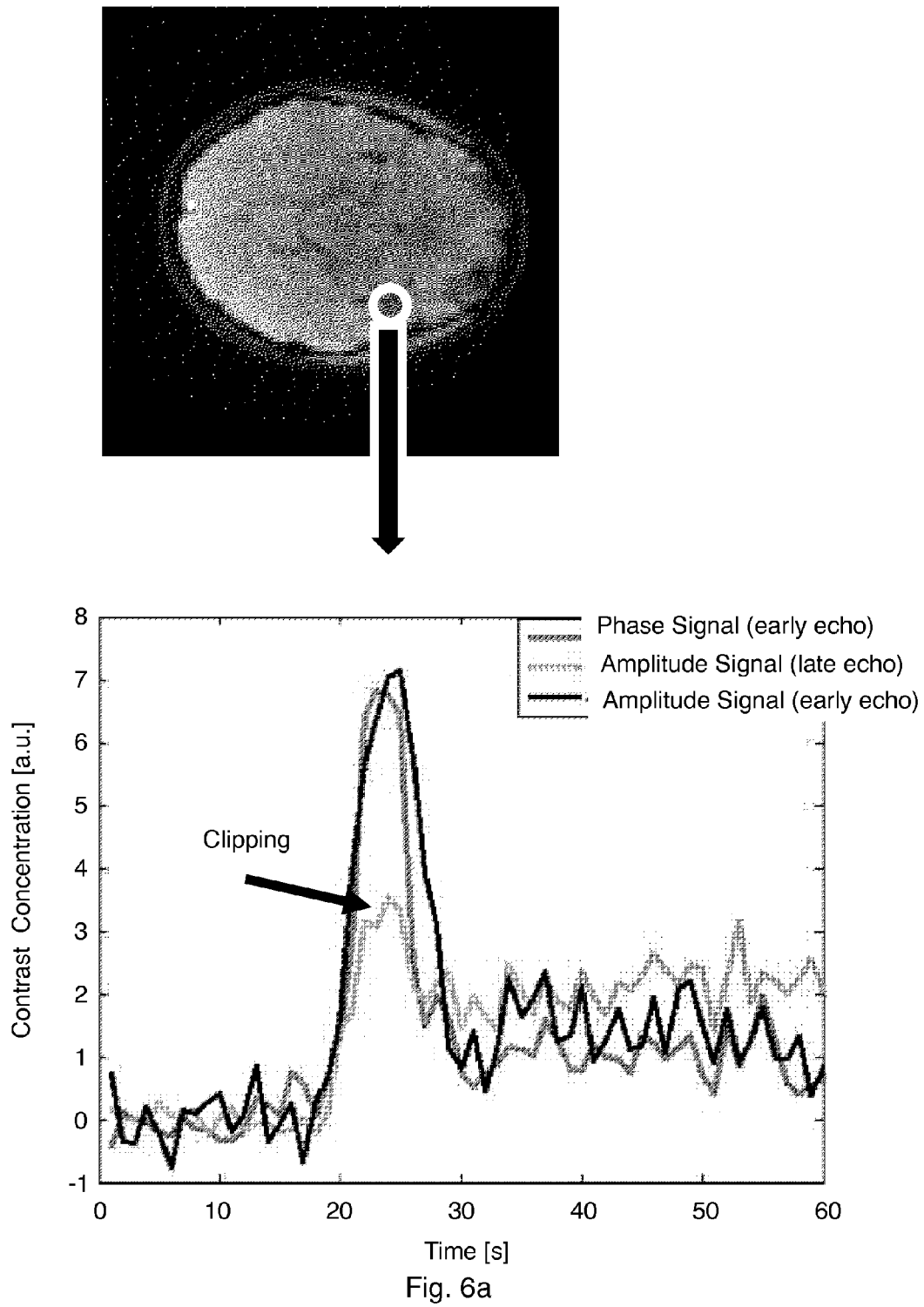
FIGS. 6a-b show an example of orientation-dependent MR signals.
Figure 6B:
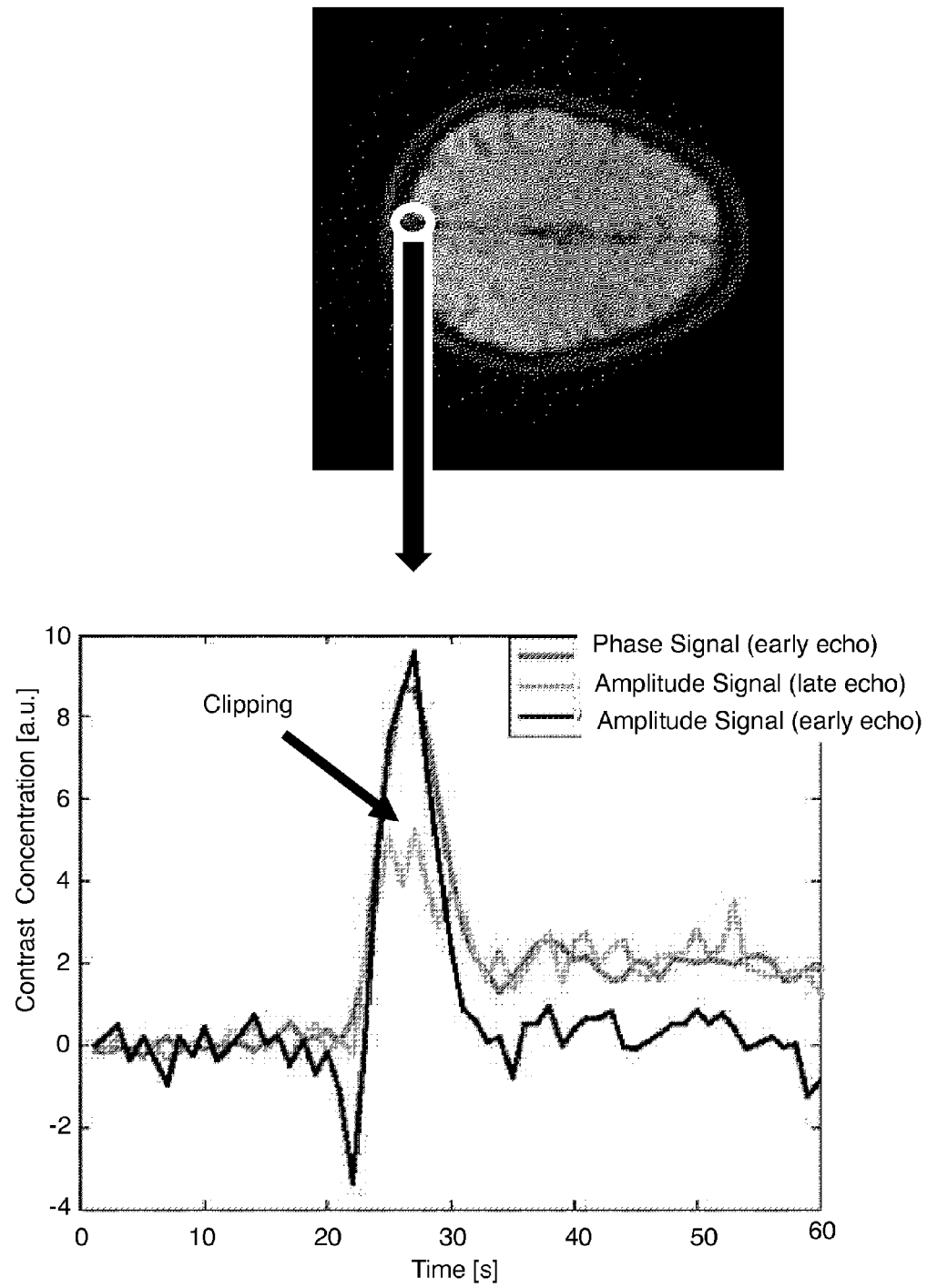

FIGS. 5a-d show examples of the major intracranial vessels and their orientation relative to $B_0$ as detected by the tubular filter. FIG. 5a relates to the transverse sinuses (TS), FIG. 5b relates to the middle cerebral artery (MCA) and Circle of Willis (Cows), and FIGS. 5c-d relate to the cerebral artery (ACA) and superior sagittal sinus (SSS). FIG. 6a shows results for a vessel oriented perpendicular to $B_0$ (e.g., AIF in MCA). FIG. 6b shows results for a vessel oriented parallel to $B_0$ (e.g., VOF in SSS). In FIGS. 6a-b vascular gadolinium concentration values are shown that were obtained either from phase (first echo) or magnitude data (first and third echo). Even though the concentration signals derived from MR magnitude data were corrected for non-linear tracer effect in bulk blood, concentration values for vessels running either parallel or perpendicular to $B_0$ were different when derived from magnitude data. Moreover, the T1-dependency of short-TE magnitude data at early bolus arrival can be clearly seen.

I3) Discussion

A new method for improving the estimation of vascular Gd concentration is provided. One prerequisite is the availability of complex data (i.e., both phase and amplitude). Of note is also that partial voluming should be avoided to assure the validity of the phase relationship. Also, the magic angle effect has to be considered, i.e. phase changes will vanish for $\theta$=54.7° and thus this method cannot be used for vessels oriented at this angle to $B_0$. Since phase information has a generally a lower contrast-to-noise ratio (CNR) than the magnitude counterpart it is therefore advisable to select vessels oriented either parallel or perpendicular to $B_0$. Major advantages of the phase-based approach are its immunity to log-Ricean transformed noise (present in perfusion signals when computed in magnitude data) and immunity to T1-artifacts as well as linearity of signal with respect to Gd concentration.

The invention claimed is:

1. A method for identifying arterial input function (AIF) and/or venous-output function (VOF) voxels in perfusion imaging of a brain, the method comprising:
    a) acquiring one or more CT or MR perfusion images;
    b) automatically selecting some or all of the voxels of the perfusion images for AIF/VOF processing;
    c) for each selected voxel, automatically fitting a Gaussian to its signal(time), where the parameters of the Gaussian are amplitude A, width $\sigma$, and time offset $t_o$;
    d) automatically normalizing each of the parameters separately to zero mean and unity standard deviation to provide normalized amplitude A', normalized width $\sigma$' and normalized time offset $t_o$';
    e) automatically excluding all voxels having A'<0, $\sigma$'>0, and $t_o$'>0, to provide a voxel subset;
    f) automatically computing a score S=A'·(−$t_o$')·(−$\sigma$') for each voxel in the voxel subset;
    g) automatically identifying the AIF/VOF voxels as being N voxels in the voxel subset having the highest scores, where N is a predetermined integer that depends on spatial resolution of the one or more CT or MR perfusion images.

2. The method of claim 1, further comprising:
    for each selected voxel, automatically computing a numerical weight L that represents a combination of: 1) a likelihood of presence of a physiologically relevant artery or vein in a given location, and 2) an inverse of distance of the selected voxel to the given location containing the artery or vein; wherein the numerical weight L is determined with reference to a predefined, atlas-based anatomic template of the brain and its vasculature;
    wherein the score for each selected voxel is multiplied by the corresponding numerical weight L prior to the automatically identifying the AIF/VOF voxels.

3. The method of claim 1, wherein the one or more CT or MR perfusion images are MR images, and further comprising:
    i) determining a spatially averaged $\Delta R2^*$ signal in the brain as a function of time;
    ii) identifying a time T0 where the spatially averaged $\Delta R2^*$ signal has its peak;
    iii) performing tubular filtering on an MR image of a brain at times before T0 to identify arteries;
    iv) performing tubular filtering on an MR image of a brain at times after T0 to identify veins;

v) determining AIF locations from the identified arteries; and vi) determining VOF locations from the identified veins.

4. The method of claim 1, further comprising:
 i) performing tubular filtering on the one or more CT or MR perfusion images to identify arteries and/or veins;
 ii) determining AIF locations from the identified arteries; and
 iii) determining VOF locations from the identified veins.

5. The method of claim 1, wherein the one or more CT or MR perfusion images are MR images having phase and/or amplitude information, and further comprising:
 i) performing tubular filtering on the MR images to provide estimates of blood vessel orientation;
 ii) using the estimates of blood vessel orientation to provide improved quantitative estimates of blood vessel tracer concentration; and
 iii) using the estimates of blood vessel tracer concentration to derive quantitative perfusion parameters from the MR images.

6. The method of claim 1, further comprising:
 i) determining a tissue post-bolus tracer/contrast agent concentration level (S1) by averaging over $N_1$ post-bolus steady-level time points located in tissue;
 ii) determining a large vessel tracer/contrast agent concentration (S2) by averaging over $N_2$ postbolus steady-level time points located in a large vessel;
 iii) determining a small vessel tracer/contrast agent concentration (S3) by averaging over $N_3$ postbolus steady-level time points located in a small vessel;
 iv) computing tissue blood volume from steady state tissue and large vessel tracer concentrations ($rCBV_{tissue}$=S1/S2);
 v) scaling small vessel arterial blood volume $rCBV_{small\_vessel}$ with large vessel blood volume as ($rCBV_{small\_vessel}$=S3/S2).

7. The method of claim 1, further comprising:
 i) acquiring CT or MR time series data that resembles a full 3D volume at T distinct times points;
 ii) 3D-Registering each of the T volumes to a template volume, which is the average of all T volumes or a selected one of the T volumes;
 iii) iterating the 3D-registration and computing a 3D-registration template volume using the registered volumes from the previous registration; and
 iv) performing slice-to-volume registration, to provide improved registration for 2D slices that do not conform to the true 3D object.

8. The method of claim 1, further comprising:
 i) performing non-linear co-registration of the average over all time points of the perfusion image volumes from a patient to a normalized 3D reference template;
 ii) identifying major arteries and veins on the reference template; and
 iii) performing an inverse of the non-linear co-registration of regions labeled as arteries and veins from the normalized 3D reference template to a coordinate frame of reference of the patient.

9. An apparatus for real-time processing of medical image data, wherein the apparatus comprises a processor configured to:
 a) acquire one or more CT or MR perfusion images;
 b) automatically select some or all of the voxels of the perfusion images for AIF/VOF processing;
 c) for each selected voxel, automatically fit a Gaussian to its signal(time), where the parameters of the Gaussian are amplitude A, width σ, and time offset to;
 d) automatically normalize each of the parameters separately to zero mean and unity standard deviation to provide normalized amplitude A', normalized width σ' and normalized time offset to';
 e) automatically exclude all voxels having A'<0, σ'>0, and to'>0, to provide a voxel subset;
 f) automatically compute a score S=A'·(−to')·(−σ') for each voxel in the voxel subset;
 g) automatically identify the AIF/VOF voxels as being N voxels in the voxel subset having the highest scores, where N is a predetermined integer that depends on spatial resolution of the one or more CT or MR perfusion images.

10. The apparatus of claim 9, further comprising:
 i) a sending computer system that transmits medical imaging data via a computer network;
 ii) a receiving computer system that receives medical imaging data via the computer network;
 wherein the processor is configured to parse medical image header information to identify prespecified commands for medical image processing and execute the commands on the receiving computer system without user interaction;
 wherein the processor is configured to convert processed medical images into tagged images;
 wherein the processor is configured to send the tagged images to a mobile or stationary display device.

* * * * *